United States Patent
Adams

(10) Patent No.: US 9,933,084 B2
(45) Date of Patent: Apr. 3, 2018

(54) METHODS AND APPARATUS TO ASSEMBLE ACTUATORS

(71) Applicant: Fisher Controls International LLC, Marshalltown, IA (US)

(72) Inventor: Daniel Martin Adams, Marshalltown, IA (US)

(73) Assignee: FISHER CONTROLS INTERNATIONAL LLC, Marshalltown, IA (US)

(*) Notice: Subject to any disclaimer, the term of this patent is extended or adjusted under 35 U.S.C. 154(b) by 109 days.

(21) Appl. No.: 14/954,433

(22) Filed: Nov. 30, 2015

(65) Prior Publication Data

US 2016/0084402 A1 Mar. 24, 2016

Related U.S. Application Data

(63) Continuation of application No. 13/593,199, filed on Aug. 23, 2012, now Pat. No. 9,228,674.

(51) Int. Cl.
*F16K 31/122* (2006.01)

(52) U.S. Cl.
CPC ..... *F16K 31/1221* (2013.01); *Y10T 29/49863* (2015.01)

(58) Field of Classification Search
CPC ........... F16K 31/1221; Y10T 29/49863; Y10T 137/0402
USPC ............... 251/63.6, 63.5, 62, 323, 321, 320; 137/15.01, 15.08, 15.18; 29/451
See application file for complete search history.

(56) References Cited

U.S. PATENT DOCUMENTS

| | | | |
|---|---|---|---|
| 2,675,204 A | 4/1954 | Johnson | |
| 2,776,557 A | 1/1957 | Bruckman | |
| 3,086,745 A * | 4/1963 | Natho | E21B 34/02 251/355 |
| 3,175,473 A | 3/1965 | Boteler et al. | |
| 3,379,405 A | 4/1968 | Natho | |
| 3,664,362 A | 5/1972 | Weise | |
| 4,011,892 A | 3/1977 | Kowalski | |
| 4,276,902 A | 7/1981 | Roth | |
| 4,744,386 A | 5/1988 | Frazer | |
| 4,853,571 A | 8/1989 | Smith et al. | |

(Continued)

OTHER PUBLICATIONS

International Bureau, "International Preliminary Report on Patentability" issued in connection with PCT Application No. PCT/US2013/055512, dated Feb. 24, 2015, 7 pages.
International Searching Authority, "International Search Report" issued in connection with PCT Application No. PCT/US2013/055512, dated Jan. 17, 2014, 3 pages.

(Continued)

*Primary Examiner* — Umashankar Venkatesan
(74) *Attorney, Agent, or Firm* — Hanley, Flight & Zimmerman, LLC

(57) ABSTRACT

Methods and apparatus to assemble actuators are described. An example method includes positioning a biasing element in a cavity defined by a housing of an actuator such that the biasing element is in an uncompressed state and at least a portion of the biasing element is to extend outside of the cavity beyond an end defined by the housing; compressing the biasing element to a compressed state until the portion of the biasing element extending outside of the cavity is positioned inside the cavity; coupling a cover to the end of the housing to capture the biasing element in the cavity; and maintaining the biasing element in the compressed state during the coupling such that the biasing element does not engage the cover.

19 Claims, 6 Drawing Sheets

(56) References Cited

U.S. PATENT DOCUMENTS

| | | | |
|---|---|---|---|
| 4,865,074 | A | 9/1989 | Bickford et al. |
| 4,885,981 | A | 12/1989 | Roettger et al. |
| 5,188,155 | A | 2/1993 | Kremer |
| 5,392,807 | A | 2/1995 | Caudle et al. |
| 5,546,772 | A | 8/1996 | Merlin et al. |
| 6,042,081 | A | 3/2000 | Anderson |
| 6,161,570 | A | 12/2000 | McNeely |
| 7,832,237 | B2 | 11/2010 | Chang et al. |
| 9,228,674 | B2 | 1/2016 | Adams |
| 2002/0139948 | A1 | 10/2002 | Hademenos et al. |
| 2004/0244850 | A1 | 12/2004 | Browne et al. |
| 2007/0080309 | A1 | 4/2007 | Daake et al. |
| 2014/0053387 | A1 | 2/2014 | Adams |

OTHER PUBLICATIONS

International Searching Authority, "Written Opinion of the International Searching Authority" issued in connection with PCT Application No. PCT/US2013/055512, dated Jan. 17, 2014, 5 pages.

Emerson Process Management, "Baumann 8900 Sanitary Control Valve," Instruction Manual, Jun. 2010, 12 pages.

United States Patent and Trademark Office, "Requirement for Restriction/Election," issued in connection with U.S. Appl. No. 13/593,199, filed Aug. 22, 2014, 7 pages.

United States Patent and Trademark Office, "Non-Final Office Action," issued in connection with U.S. Appl. No. 13/593,199, filed May 6, 2015, 22 pages.

United States Patent and Trademark Office, "Notice of Allowance," issued in connection with U.S. Appl. No. 13/593,199, filed Sep. 8, 2015, 18 pages.

\* cited by examiner

METHODS AND APPARATUS TO ASSEMBLE ACTUATORS

RELATED APPLICATIONS

This patent arises from a continuation of U.S. patent application Ser. No. 13/593,199, filed Aug. 23, 2012. The entirety of U.S. patent application Ser. No. 13/593,199 is incorporated herein by reference.

FIELD OF THE DISCLOSURE

This patent relates generally to actuators and, more specifically, to methods and apparatus to assemble actuators.

BACKGROUND

Control valves are commonly used in process control systems to control the flow of process fluids. A control valve typically includes an actuator (e.g., a pneumatic actuator, a hydraulic actuator, etc.) operatively coupled to a flow control member to automate the control valve. In operation, a control fluid (e.g., air) is supplied to the actuator to position the flow control member relative to a valve seat to regulate fluid flow through the control valve.

Many process control applications require actuators (e.g., valve actuators) to include fail-safe systems. A fail-safe system provides protection to a process control system by causing the actuator and, thus, the flow control member to move to either a fully-closed position or a fully-opened position during emergency situations, power failures, and/or if the control fluid (e.g., air) supply to an actuator (e.g., a pneumatic actuator) is shut down.

To provide a fail-safe system, some actuators include a biasing member disposed in a cylinder of the actuator. However, in some instances, including a biasing member may significantly increase a dimensional envelope (e.g., length) of the actuator. In other instances, including a biasing member may require complex assembly or tools if the cylinder of the actuator has a smaller dimensional length than the biasing element.

SUMMARY

An example method includes positioning a biasing element in a cavity defined by a housing of an actuator such that the biasing element is in an uncompressed state and at least a portion of the biasing element is to extend outside of the cavity beyond an end defined by the housing; compressing the biasing element to a compressed state until the portion of the biasing element extending outside of the cavity is positioned inside the cavity; coupling a cover to the end of the housing to capture the biasing element in the cavity; and maintaining the biasing element in the compressed state during the coupling such that the biasing element does not engage the cover.

Another example method includes positioning a biasing element in a cavity of an actuator, compressing the biasing element, maintaining the biasing element in a compressed position inside the cavity, and coupling a cover to the actuator when the biasing element is in the compressed position such that the biasing element does not engage the cover when the cover is being attached to the actuator.

Yet another example method includes positioning a spring having a relaxed state in a cavity of a housing having a first length such that the spring has a second length that is greater than the first length and at least a portion of the spring extends from the housing, compressing the spring via a compression assembly to a first compressed state having a third length that is less than the first length, and attaching a cover to the housing to enclose the cavity after the spring is positioned in the first compressed state via the compression assembly, where at least a portion of the compression assembly being accessible via the cover when the cover is coupled to the housing.

DETAILED DESCRIPTION

Figure 1:
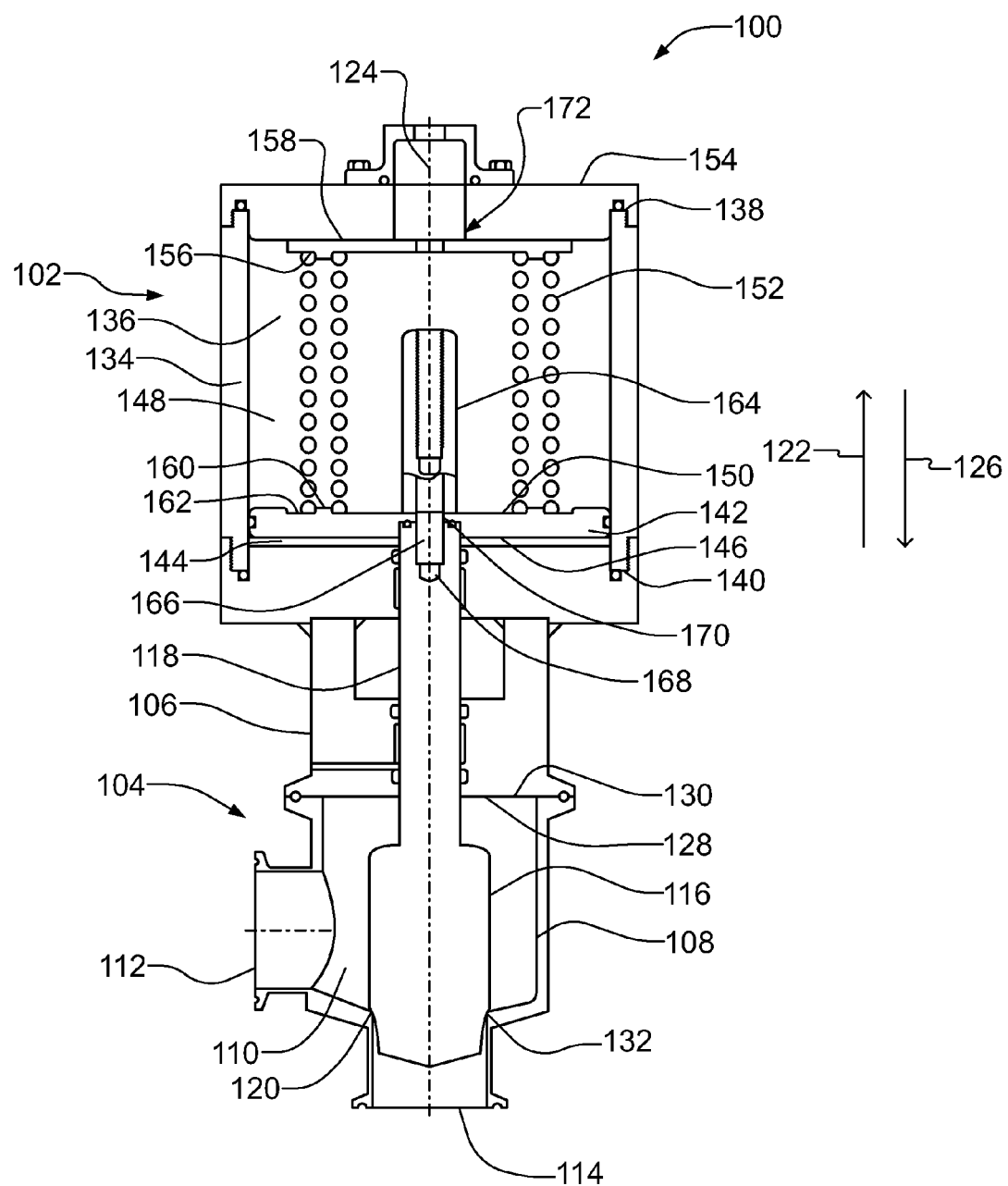
FIG. 1 illustrates an example actuator constructed in accordance with the teachings disclosed herein.

Some known actuators (e.g. spring-return actuators) provide a mechanical fail-safe return. For example, to provide a mechanical fail-safe return, some such known actuators employ a spring disposed in a cylinder of the actuator and in direct contact with a loading member (e.g., a diaphragm or a piston) of the actuator. The spring urges the loading member to one end of a stroke travel (e.g. a fully-opened or a fully-closed position) when a control fluid supply to the actuator fails and/or is otherwise removed.

To facilitate assembly of an actuator employing a spring-return mechanism, a cylinder is often provided with a dimensional profile (e.g., a length or a height) to contain the spring inside (e.g., fully inside) a cavity of the cylinder when the spring is in a relaxed state or an uncompressed condition. In this manner, the spring does not impart a significant force to the cover when the cover is attached to the cylinder.

However, in certain applications (e.g., sanitary markets), space may be limited and, thus, providing an actuator having a dimensional profile substantially equal to a dimensional length of the spring when the spring is in the relaxed state may not be practical or feasible. Thus, in such instances, a cylinder of an actuator if often provided with a dimensional profile that is smaller than a dimensional profile of spring when the spring is in a relaxed state. As a result, in such instances, the spring imparts a load or force to the cover when the cover is being coupled to the cylinder. A load imparted to the cover during assembly and/or disassembly of the cover and a cylinder may cause the cover and/or the cylinder to wear and/or become damaged due to, for example, galling. Galling refers to wear and/or transfer of material between metallic surfaces in contact with each other due to, for example, increased compressive stress during dynamic contact and/or sliding between metallic surfaces.

In sanitary applications, for example, a cover and/or a cylinder of an actuator may be composed of a material providing anti-corrosive or cleanliness characteristics (e.g., stainless steel, 300 series stainless steel, etc.). However, materials such as stainless steel are relatively malleable. As a result, actuator components (e.g., a housing and/or a cover) composed of stainless steel material may be susceptible to galling during assembly.

The example apparatus and related methods disclosed herein prevent damage (e.g., due to galling) to actuator components during assembly. More specifically, the apparatus and related methods disclosed herein operatively decouple or remove a force (e.g., a vertical force) of a biasing element from some components (e.g., a cover, a base, etc.) of an actuator during assembly and/or disassembly of the actuator.

As a result, the example apparatus and related methods disclosed herein enable actuators to have relatively small dimensional envelope. Additionally or alternatively, the example apparatus and related methods disclosed herein enable an actuator composed of malleable material to be assembled and/or disassembled without significant damage (e.g., due to galling) while enabling the actuator to have a relatively small dimensional envelope or profile. In particular, an example actuator disclosed herein may have a profile or dimensional length that is less than a profile or dimensional length of a spring or biasing element. In this manner, the example actuators disclosed herein may be employed in applications (e.g., sanitary applications) having relatively small or limited space, but requiring use of anti-corrosive materials such as, for example, stainless steel.

To operatively decouple or effectively remove a force of the biasing element during assembly and/or disassembly of the actuator, the example actuator apparatus and related methods disclosed herein employ a compression apparatus. More specifically, the example compression apparatus disclosed herein positions or compresses a portion of a biasing element inside of the cavity and away from an edge of the cylinder. Thus, any portion of the biasing element extending from the cavity is compressed inside the cavity. In this manner, an example cover may be coupled to the end of the cylinder without influence of a force that would otherwise be imparted to the cover by the biasing element. As a result, the force of the biasing element is effectively removed from the cover as the cover is being attached to the cylinder. Removal of the force from the cover significantly prevents galling during assembly and/or disassembly of the cover relative to the cylinder when the cover and/or the cylinder are composed of, for example, stainless steel. Further, at least a portion of the compression assembly is accessible via the cover when the cover is coupled to the actuator and/or at least a portion of the compression assembly may remain in the housing during operation without interference to the operation of the actuator.

FIG. 1 illustrates an example control valve assembly 100 having an example actuator 102 constructed in accordance with the teachings disclosed herein. In this example, the actuator 102 is coupled to a valve 104 via a bonnet 106. The valve 104 has a valve body 108 defining a fluid flow passageway 110 between an inlet 112 and an outlet 114. A flow control member 116 is interposed in the fluid flow passageway 110 and is operatively coupled to the actuator 102 via a valve stem 118. The actuator 102 causes the flow control member 116 to move relative to a valve seat 120 (e.g., a valve body or seat ring) disposed in the passageway 110 to control the flow of fluid between the inlet 112 and the outlet 114. Thus, the flow rate permitted through the valve 104 is controlled by the position of the flow control member 116 relative to the valve seat 120.

More specifically, the flow control member 116 moves away from the valve seat 120 in a first rectilinear direction 122 along a longitudinal axis 124 of the actuator 102 to allow fluid flow between the inlet 112 and the outlet 114 and moves toward the valve seat 120 in a second rectilinear direction 126 along the longitudinal axis 124 of the actuator 102 to restrict or prevent fluid flow between the inlet 112 and the outlet 114. Additionally, movement of the flow control member 116 in the first rectilinear direction 122 is limited by a first stop 128 (e.g., defined by a wall 130 of the valve body 108) and movement of the flow control member 116 in the second rectilinear direction 126 is limited by a second stop 132 (e.g., defined or provided by the valve seat 120 of the valve body 108).

The actuator 102 of the illustrated example includes a cylinder or housing 134 that defines a cavity 136 between a first end or edge 138 of the housing 134 and a second end or edge 140 of the housing 134. A loading member or piston 142 is positioned in the cavity 136 to define a pressure chamber 144 adjacent a first side or face 146 of the piston 142 and a spring chamber 148 adjacent a second side 150 of the piston 142. A biasing element 152 is positioned in the spring chamber 148 and imparts a force to the second side 150 of the piston 142 when the actuator 102 is assembled as shown in FIG. 1. In this example, the biasing element 152 includes two springs. However, in other examples, the biasing element may be one spring or more than two springs.

To capture or encase the biasing element 152 in the housing 134, the actuator 102 employs a cover 154. The cover 154 of the illustrated example is removably attached to the edge 138 of the housing 134 to capture the biasing element 152 in the spring chamber 148 between the second side 150 of the piston 142 and the cover 154. Thus, the cover 154 at least partially defines the spring chamber 148 and engages a first end 156 of the biasing element 152 to provide a spring seat 158 when the cover 154 is attached or coupled to the housing 134. As shown, the second side 150 of the piston 142 includes an annular wall 160 (e.g., defined by a recess) adjacent a second end 162 of the biasing element 152 to guide or orient the biasing element 152 in the cavity 136.

As shown in FIG. 1, an actuator stem or stem connector 164 couples the piston 142 to the valve stem 118. As shown, the actuator stem 164 includes a fastener 166 that engages an opening 168 of the valve stem 118 through an opening 170 (e.g., a central opening) in the piston 142.

Additionally, as described in greater detail below in connection with FIGS. 2-4, the example actuator 102 employs a compression assembly 172 coupled to the first end 156 of the biasing element 152 to facilitate assembly of the actuator 102.

In operation, a pressurized control fluid is provided or supplied to the pressure chamber 144 to impart a force to the first side 146 of the piston 142. A pressure differential provided across the piston 142 by a pressure of the control fluid in the pressure chamber 144 and a pressure provided by the biasing element 152 to the second side 150 of the piston 142 causes the piston 142 to move the flow control member 116 in the first and second rectilinear directions 122 and 126. More specifically, a pressure or force provided to the first side 146 of the piston 142 that is greater than a pressure or force provided to the second side 150 causes the flow control member 116 to move in the first rectilinear direction 122. Likewise, a pressure or force provided to the first side 146 of the piston 142 that is less than a pressure or force provided by the second side 150 of the piston 142 causes the flow control member 116 to move in the second rectilinear direction 126.

For example, the flow control member 116 sealingly engages the valve seat 120 to prevent or restrict fluid flow through the valve 104 when the flow control member 116 engages the valve seat 120 (e.g., a fully-closed position) and the flow control member 116 is spaced away from the valve seat 120 to allow fluid flow through the valve 104 (e.g., a fully-opened position). As noted above, the first and second stops 128 and 132 limit the travel of the flow control member 116 and, thus, the piston 142 in the first and second rectilinear directions 122 and 126, respectively. The compression assembly 172 does not interfere or affect the operation of the piston 142 and/or the actuator 102 when the flow control member moves between the first and second stops 128 and 132.

Further, in this example, the actuator 102 of the illustrated example provides a fail-to-close fail-safe mechanism. In other words, the biasing element 152 biases the flow control member 116 toward the valve seat 120 to prevent fluid flow through the passageway 110 of the valve 104 when a control fluid is removed from the pressure chamber 144. However, in other examples, the control valve assembly 100 may be configured to provide a fail-to-open fail-safe mechanism. For example, the flow control member 116 may be configured to move away from the valve seat 120 to an open position when a control fluid is removed from the pressure chamber 144.

Figure 2:
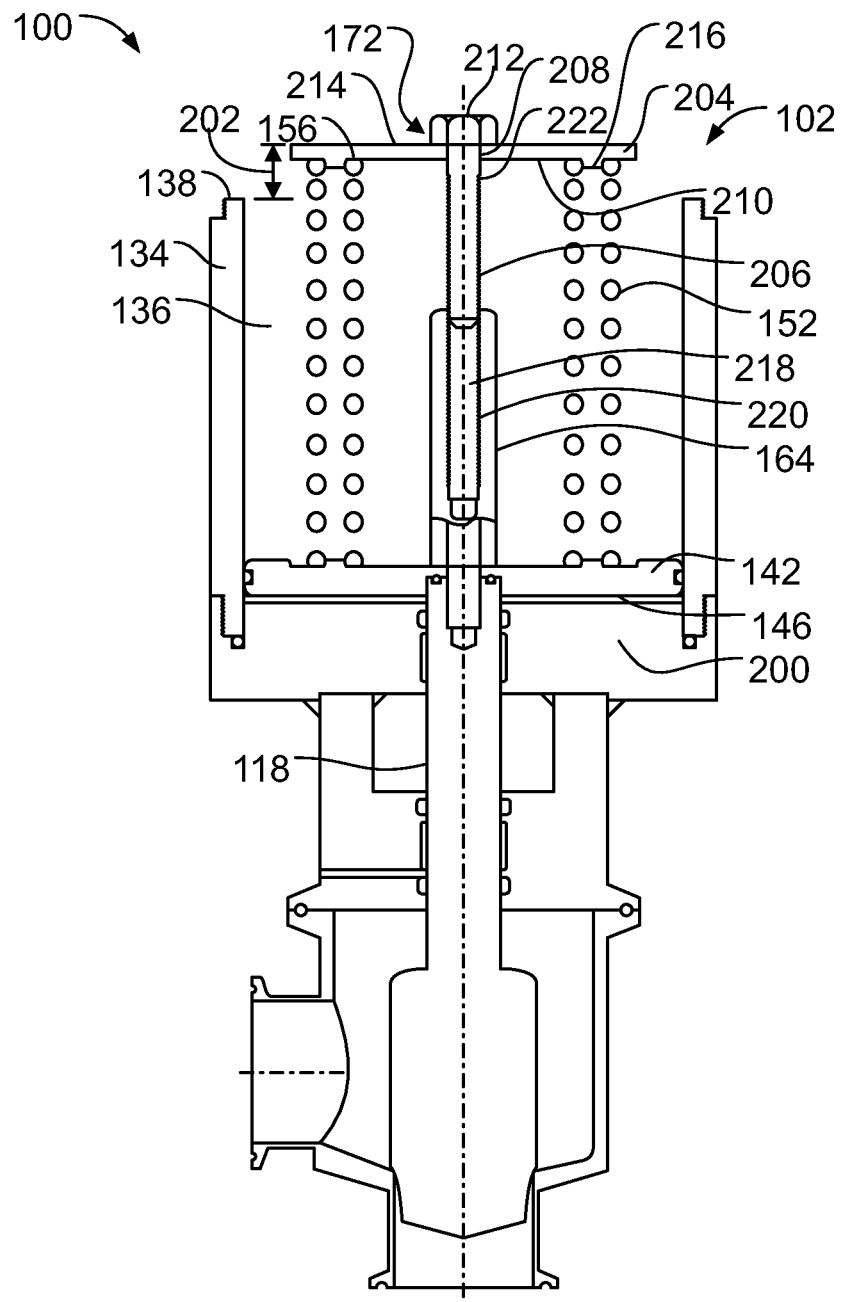
FIG. 2 illustrates the example actuator of FIG. 1 in a partially-assembled state when a biasing element is in an uncompressed condition.

FIG. 2 illustrates the example actuator 102 of FIG. 1 in a partially assembled state. To assemble the actuator 102, the piston 142 is attached to the actuator stem 162 and is disposed in the cavity 136 of the housing 134. During assembly, the piston 142 (e.g., the first side 146 of the piston 142) is positioned adjacent or engages a surface or base 200 (e.g., a removable base) of the housing 134. The valve stem 118 is attached to the piston 142 via the actuator stem 164.

As shown in FIG. 2, the biasing element 152 is then positioned in the cavity 136 of the housing 134 in a relaxed state or uncompressed condition. In the relaxed state, the biasing element 152 imparts a force that is significantly less than a force imparted by the biasing element 152 when the biasing element 152 is in a compressed state or condition. As shown in FIG. 2, the first end 156 of the biasing element 152 extends or protrudes outside of the cavity 136 away from the edge 138 of the housing 134 by a distance 202 when the biasing element 152 is positioned in the cavity 136 in the relaxed state. In other words, a dimensional profile (e.g., a length or height) of the biasing element 152 is greater than a dimensional profile (e.g., a height or length) of the cavity 136 and/or the housing 134 when the biasing element 152 is disposed in the cavity 136 in the relaxed state.

Prior to attachment or coupling the cover 154 to the housing 134, the biasing element 152 is compressed via the compression assembly 172. The compression assembly 172 is coupled to the first end 156 of the biasing element 152. In the illustrated example, the compression assembly 172 includes a plate 204 and a fastener 206. The plate 204 is positioned or coupled to the first end 156 of the biasing element 152 and the fastener 206 couples the plate 204 to the actuator stem 164. As shown, the fastener 206 is positioned through an opening 208 of the plate 204. A first surface 210 of the plate 204 engages the first end 156 of the biasing element 152 and a head 212 of the fastener 206 engages a second surface 214 of the plate 204 opposite the first surface 210. The plate 204 of the illustrated example includes an annular wall or lip 216 to guide or orient the biasing element 152 in the cavity 136. Additionally or alternatively, the plate 204 overlaps or engages an entire surface area or diameter of the biasing element 152 (e.g., engages the springs) to evenly distribute a load to the biasing element 152 when the biasing element 152 is compressed or decompressed during assembly. Further, the fastener 206 includes a threaded portion 218 to threadably engage a threaded opening 220 of the actuator stem 164 and an unthreaded portion 222 to slide relative to the opening 208 of the plate 204. In the position shown in FIG. 2, the fastener 206 is partially threaded into the threaded opening 220 of the actuator stem 162.

Figure 3:
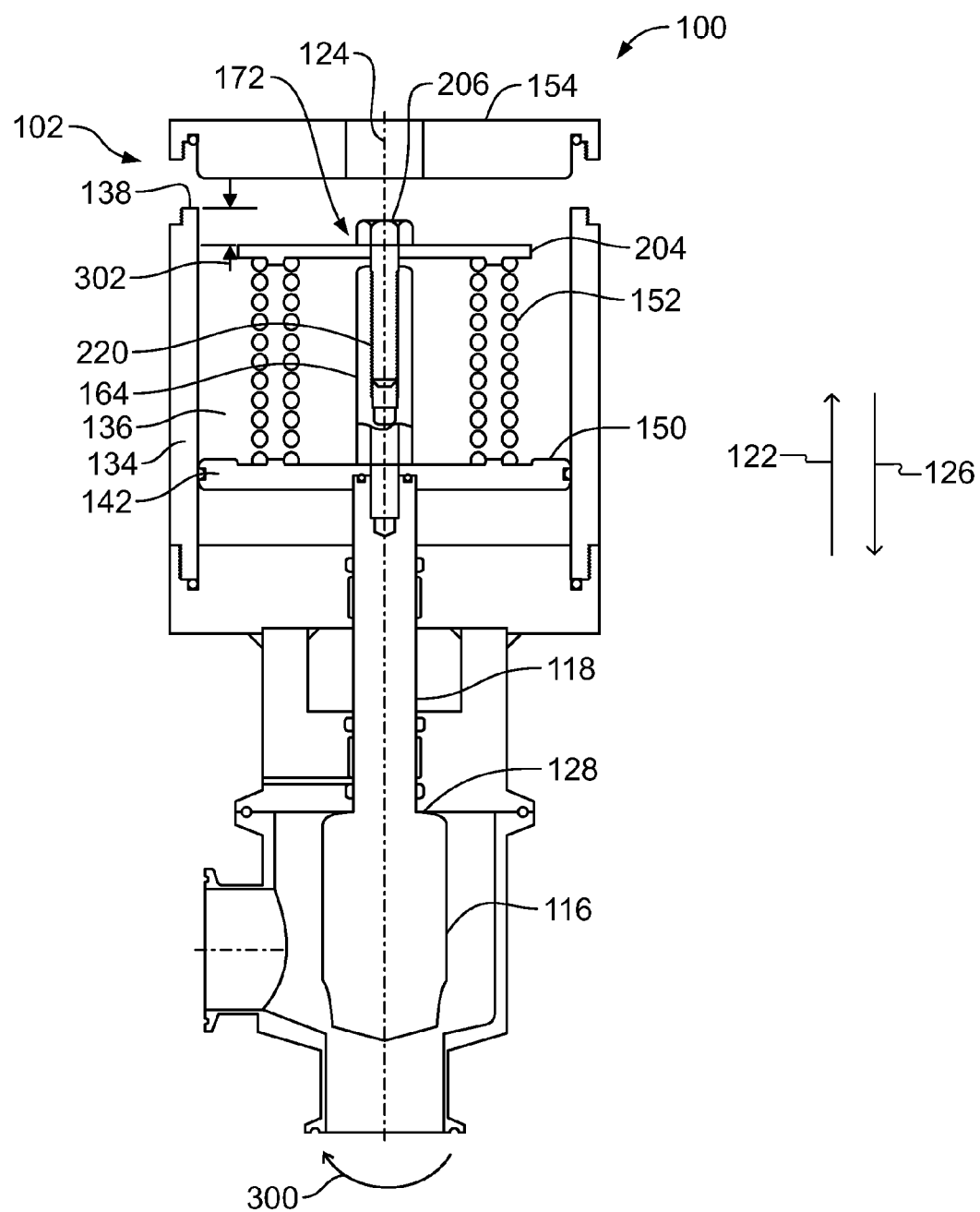
FIG. 3 illustrates the example actuator of FIGS. 1 and 2 in a partially-assembled state when the biasing element is in a compressed state and a cover of the example actuator is removed.

FIG. 3 illustrates the example actuator 102 in another partially assembly state. Referring to FIG. 3, after the compression assembly 172 is attached to the biasing element 152, the compression assembly 172 compresses the biasing element 152 inside the cavity 136. More specifically, the compression assembly 172 positions or moves the portion of the biasing element 152 extending outside of the cavity 136 shown in FIG. 2 toward the inside of the cavity 136 and away from the edge 138 of the housing 134.

To compress the biasing element 152, the fastener 206 is rotated (e.g., via a tool or wrench) in a first rotational direction 300 (e.g., a clockwise direction) about the longitudinal axis 124. More specifically, the fastener 206 is screwed into the threaded opening 220. As the fastener 206 is threaded into the threaded opening 220 of the actuator stem 164, the fastener 206 initially draws the piston 142 toward the edge 138 of the housing 134 in the first rectilinear direction 122 (e.g., an upward direction in the orientation of FIG. 3) until the flow control member 116 engages the first stop 128, which prevents further movement of the piston 142 toward the edge 138 of the housing 134.

Further rotation of the fastener 206 in the first rotational direction 300 causes the plate 204 to move in the second rectilinear direction 126 along the longitudinal axis 124 toward the second side 150 of the piston 142 (e.g., a downward direction toward the flow control member 116 in the orientation of FIG. 3). Movement of the plate 204 in the second rectilinear direction 126 causes the biasing element 152 to compress. In other words, the dimensional profile (e.g., the length or height) of the biasing element 152 in the compressed position is less than the dimensional profile (e.g., the length or height) of the biasing element 152 when the biasing element 152 is in the relaxed state as shown in FIG. 2. The biasing element 152 is compressed to a dimensional profile that is less than the dimensional profile of cavity 136 so that the biasing element 152 is disposed or positioned inside of the cavity 136 and spaced away from the edge 138 of the housing 134. For example, the first end 156 of the biasing element 152 may be compressed by a distance 302 relative to the edge 138 of the housing 134.

Further, the compression assembly 172 maintains the biasing element 152 in the compressed position or state inside the cavity 136. With the biasing element 152 compressed inside of the cavity 136 as shown in FIG. 3, the cover 154 is attached or coupled to the edge 138 of the housing 134. In this example, the cover 154 is threadably coupled to the edge 138 of the housing 134. In other examples, the cover 154 may be coupled to the housing 134 via a clamp, welding, or any other fastening mechanism(s) or technique(s). With the biasing element 152 spaced away from the edge 138 of the housing 134, the cover 154 is attached to the edge 138 of the housing 134 without influence of a spring force of the biasing element 152. In other words, because the biasing element 152 is compressed inside of the cavity 136 and spaced away from the edge 138 of the housing 134, the biasing element 152 does not engage the cover 154 as the cover 154 is being coupled to the housing 134. As a result, a spring force of the biasing element 152 (e.g., an upward vertical force in the orientation of FIG. 3) is operatively decoupled or effectively removed from the cover 154 during assembly of the cover 154 to the housing 134.

Removing the force of the biasing element 152 from the cover 154 during assembly of the cover 154 facilitates assembly of the cover 154 and the housing 134 because less holding force is needed to rotate the cover 154 relative to the housing 134. Additionally or alternatively, decoupling the spring force of the biasing element 152 from the cover 154 during assembly significantly reduces or prevents damage to the cover 154 and the housing 134 due to, for example, galling that may otherwise occur if the biasing element 152 is engaged or in contact with the cover 154 as the cover 154 is assembled to the housing 134. Therefore, the cover 154 and/or the housing 134 (e.g., threads of the cover 154 and/or the housing 134) may be composed of stainless steel and removal of the force of the biasing element 152 from the cover 154 during assembly prevents or significantly reduces damage or wear due to galling.

Figure 4:
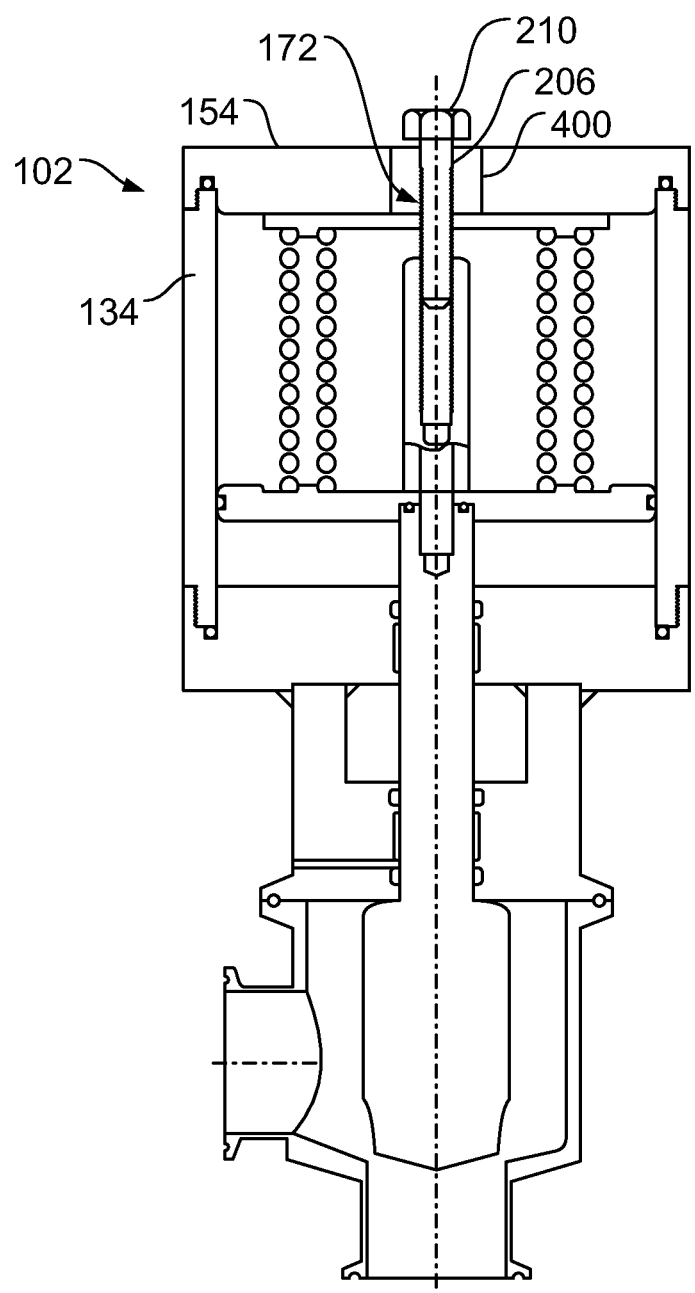
FIG. 4 illustrates the example actuator of FIGS. 1-3 having a cover coupled to the example actuator and the biasing element is in the compressed state.

FIG. 4 illustrates the example actuator 102 of FIGS. 1-3 after the cover 154 has been attached to the housing 134. The cover 154 of the illustrated example includes an opening 400 to provide access to at least a portion of the compression assembly 172 when the cover 154 is attached to the housing 134. For example, as shown, the opening 400 is aligned (e.g., coaxially aligned) with the fastener 206 such that the head 212 of the fastener 206 is accessible and/or protrudes from the opening 400 when the cover 154 is attached to the housing 134.

Figure 5:
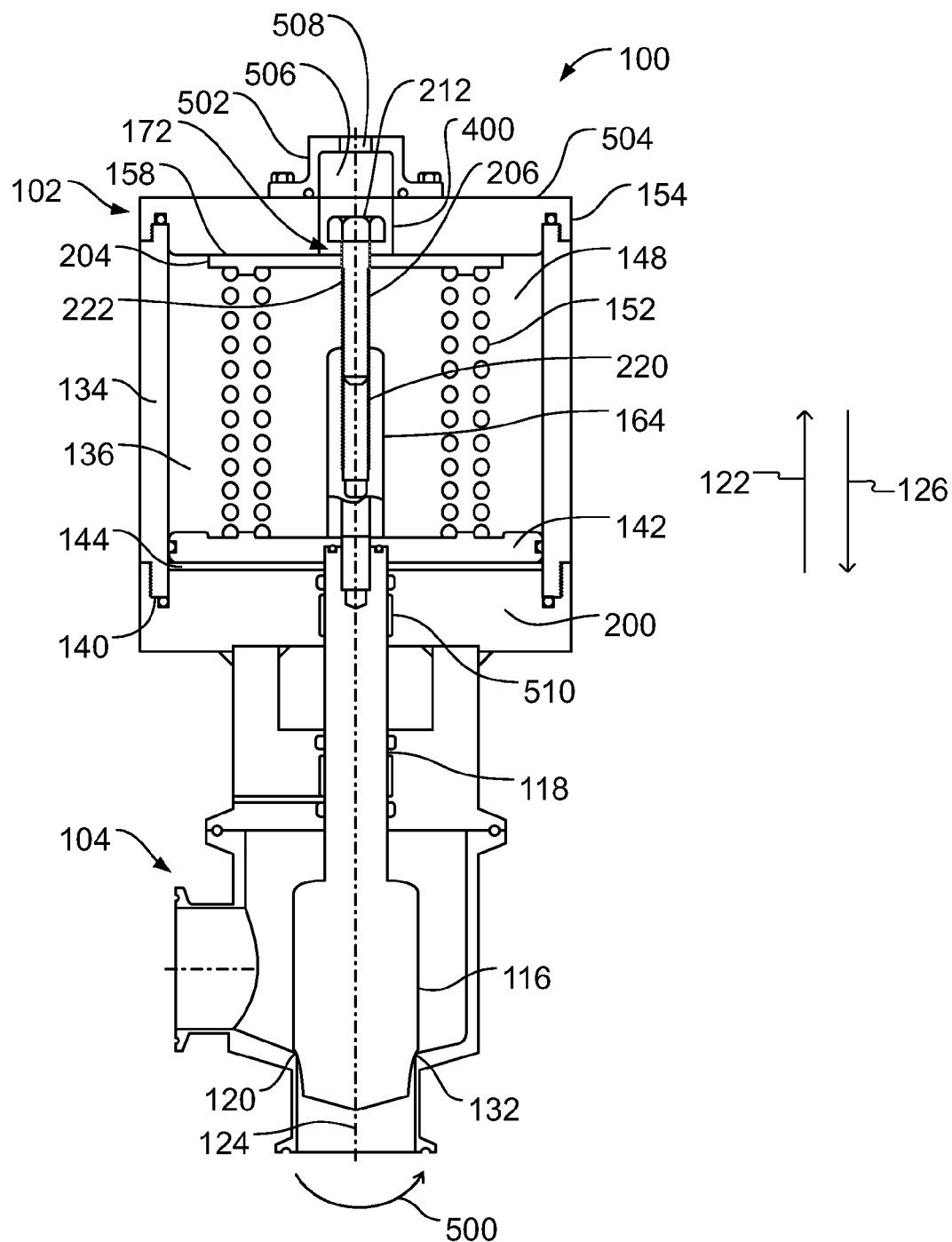
FIG. 5 illustrates the example actuator of FIGS. 1-4 but showing a portion of the example compression assembly removed from the example actuator.

FIG. 5 illustrates the example actuator 102 in an assembled state. After the cover 154 is attached to the housing 134 as shown in FIG. 4, the compression assembly 172 is adjusted to at least partially decompress the biasing element 152 such that the piston 142 is positioned to a stroke length position of the actuator 102 (e.g., a full stroke length position). In other words, in the assembled state, the dimensional length or height of the biasing element 152 is substantially equal to a dimensional length or height of the cavity 136 as shown in FIG. 5. However, if a greater amount of biasing force is needed, the compression assembly 172 can adjust or maintain the biasing element 152 in a compressed state such that the dimensional length or height of the biasing element 152 is less than the dimensional length or height of the cavity 136.

To decompress the biasing element 152, the fastener 206 is rotated (e.g., via a tool or wrench) in a second rotational direction 500 (e.g., a counterclockwise direction) about to the longitudinal axis 124. In particular, movement of compression assembly 172 or the plate 204 in the first rectilinear direction 122 causes the biasing element 152 to decompress or expand. More specifically, rotation of the fastener 206 in the second rotational direction 500 causes the fastener 206 to unthread and, thus, move away from the threaded opening 220 of the actuator stem 164. As the fastener 206 is unthreaded from the threaded opening 220 of the actuator stem 164, the compression assembly 172 or the plate 204 move in the first rectilinear direction 122 toward the cover 154 along the longitudinal axis 124 due to the force of the biasing element 152 (e.g., an upward direction toward the flow control member 116 in the orientation of FIG. 3) acting on the compression assembly 172 or the plate 204. The fastener 206 is rotated in the second rotational direction 500 until the plate 204 engages the cover 154.

When the compression assembly 172 or the plate 204 engages the cover 154, further rotation of the fastener 206 in the second rotational direction 500 causes the piston 142 to move in the second rectilinear direction 126 toward the base 200 (e.g., a downward direction in the orientation of FIG. 3) until the flow control member 116 engages the second stop 132 (e.g., the valve seat 120).

As shown in FIG. 5, a cover or cap 502 may be coupled to an outer surface 504 of the cover 154 to prevent contaminates or debris from entering the opening 400 of the cover 154 and, thus, the spring chamber 148. In operation, the unthreaded portion 222 of the fastener 206 slides relative to the opening 208 of the plate 204 when the flow control member 116 moves relative to the valve seat 120. The cap 502 of the illustrated example defines a cavity 506 to receive a portion of the fastener 206 (e.g., the head 212) during operation of the actuator 102. Thus, the fastener 206 and/or the cap 502 do not interfere with the operation of the actuator 102 (e.g., when the valve 104 is in the fully-open position as shown in FIG. 4). The cap 502 may include a vent 508 to allow the spring chamber 148 to vent to the atmosphere. In some examples, as shown in FIG. 1, the fastener 206 may be removed and/or decoupled from the actuator stem 164 via the opening 400 prior to coupling the cap 502 to the cover 154.

To disassemble the actuator 102, the biasing element 152 is positioned away from the cover 154 via the compression assembly 172 and the cover 154 is decoupled from the housing 134.

The example actuator 100 of FIGS. 1-5 is configured as a fail-to-close fail-safe mechanism. Although not shown, the actuator 102 of the illustrated example may be configured as a fail-to-open fail-safe mechanism. For example, the biasing element 152 may be disposed in the pressure chamber 144 instead of the spring chamber 148. In such an example, the piston 142 may be positioned in the cavity 136 and positioned against the cover 154. The compression assembly 172 may be employed to compress the biasing element 152 away from the end 140 of the housing 134. For example, an actuator stem or cylindrical body may be coupled to the piston 142. The actuator stem may have an internally threaded aperture to receive the fastener 206 of the compression assembly 172 and a threaded outer surface to receive the valve stem 118. For example, after the biasing element 152 is compressed to a compressed position inside of the cavity 136 and away from the end 140 of the housing 134 via the compression assembly 172, the base 200 is attached or coupled (e.g., threadably coupled) to the end 140 of the housing 134. The fastener 206 is then removed from the actuator stem via an opening 510 of the base 200, causing the biasing element 152 to decompress to engage the base 200. The valve stem 118 may then be coupled to the actuator stem via the threaded outer surface of the actuator stem. In yet another example, the actuator stem does not employ a threaded outer surface. Instead, a double-threaded fastener (e.g., a stud) having a first threaded end to couple to the valve stem 118 and a second threaded end to couple to the internal threaded opening of the actuator stem after the fastener 206 is removed from the actuator stem.

Figure 6:
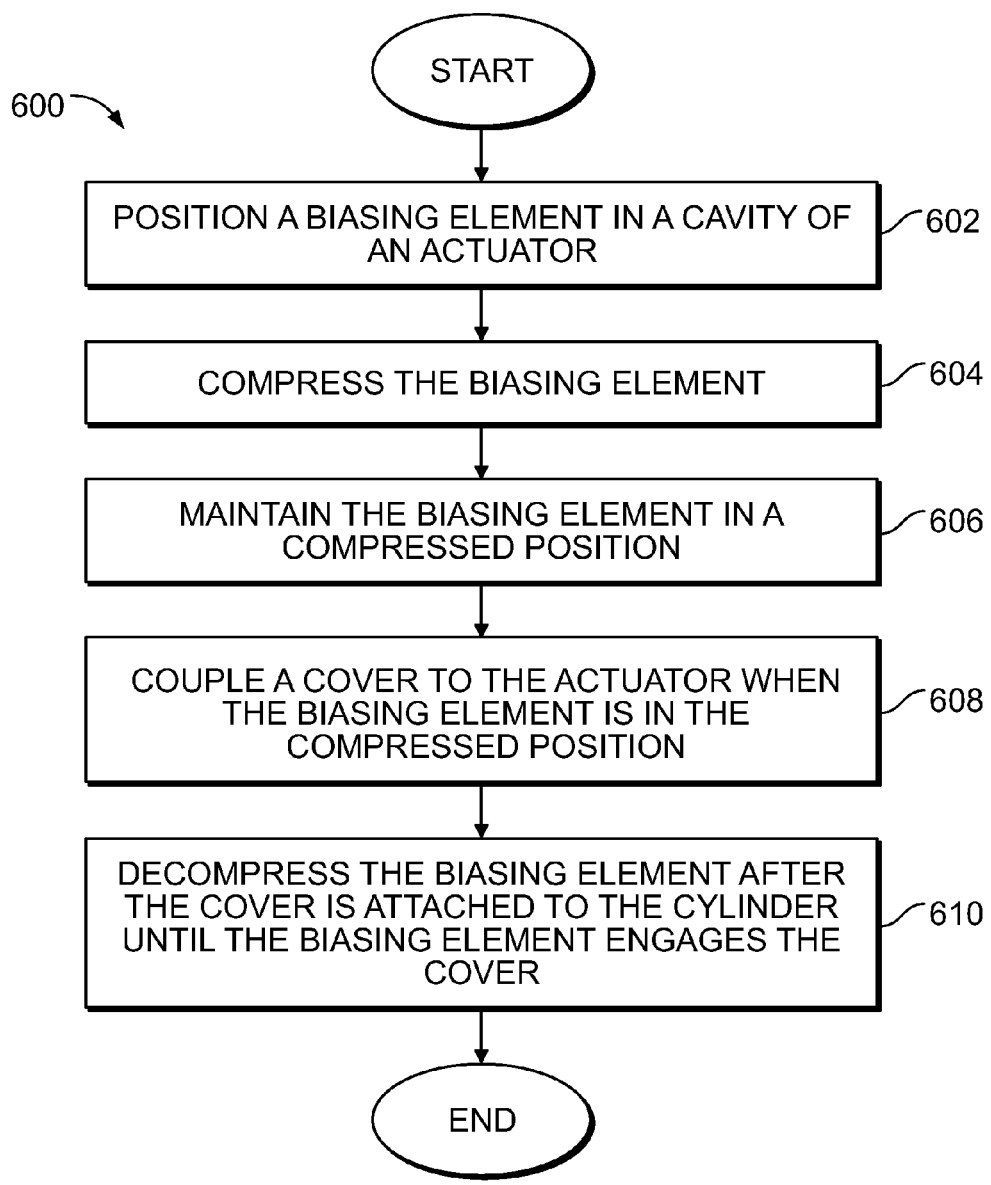
FIG. 6 depicts a flowchart of an example method to assemble an example actuator disclosed herein.

FIG. 6 is a flowchart of an example method 600 that may be used to assemble an example actuator disclosed herein such as the example actuator 102 of FIGS. 1-5. While the example method 600 may be used to assemble an example actuator disclosed herein, one or more of the blocks and/or processes illustrated in FIG. 6 may be combined, divided, re-arranged, omitted, eliminated and/or implemented in any other way. Further still, the example method of FIG. 6 may include one or more processes and/or blocks in addition to, or instead of, those illustrated in FIG. 6, and/or may include more than one of any or all of the illustrated processes and/or blocks. Although the example method 600 is described with reference to the flowchart illustrated in FIG. 6, many other methods of assembling an example actuator may alternatively be used.

The example method 600 begins by positioning a biasing element in a cavity of a housing or cylinder of an actuator (block 602). More specifically, the biasing element is positioned in the cavity in a relaxed state or uncompressed condition. In the relaxed state, a portion or an end (e.g., the first end 154 of FIG. 1) of the biasing element protrudes from the cavity and past an edge of the housing.

After the biasing element is positioned in the housing, the biasing element is compressed to a compressed position (block 604). In the compressed position, the end of the biasing element is positioned inside the cavity and away from the edge of the housing. A compression assembly (e.g., the compression assembly 172) may be employed to compress the biasing element to the compressed position. For example, a plate of the compression assembly may be coupled to the end of the biasing element and the plate can be coupled to an actuator stem via a fastener. For example, the compression assembly may cause the biasing element to move or compress in a first rectilinear direction along a longitudinal axis of the biasing element or cavity by rotating the fastener of the compression assembly in a first rotational direction about the longitudinal axis and into a threaded opening of the actuator stem.

The biasing element is then maintained in the compressed position (block 606). More specifically, the biasing element is maintained in the compressed position until a cover is coupled or attached to the housing of the actuator. For example, the compression assembly maintains the biasing element in the compressed position via the plate when the fastener of the plate is threaded in the threaded opening of the actuator stem.

A cover is then attached or coupled to the housing 134 when the biasing element is in the compressed position. (block 608). For example, the cover is attached or coupled to the end of the housing while the biasing element is positioned away from the end of the housing. For example, in the compressed position, the biasing element is operatively decoupled or spaced away from the cover as the cover is coupled to the housing of the actuator. As a result, the cover is threadably coupled to the end of the housing while the biasing element is operatively decoupled from the cover.

After the cover is attached to the housing of the actuator, the biasing element is decompressed (block 610). For example, the biasing element may be decompressed via the compression assembly. For example, the compression assembly may cause the biasing element to move or decompress in a second rectilinear direction along the longitudinal axis of the biasing element or cavity by rotating the fastener of the compression assembly in a second rotational direction about the longitudinal axis and out of the threaded opening of the actuator stem. For example, the biasing element may be decompressed until the plate of the compression assembly and/or the biasing element engages the cover of the actuator. Additionally, the fastener may be removed from the actuator stem and/or the housing via an aperture in the cover of the actuator.

Although certain example methods, apparatus and articles of manufacture have been described herein, the scope of coverage of this patent is not limited thereto. On the contrary, this patent covers all methods, apparatus and articles of manufacture fairly falling within the scope of the appended claims either literally or under the doctrine of equivalents.

What is claimed is:

1. A method comprising:
    positioning a biasing element in a cavity defined by a housing of an actuator such that the biasing element is in an uncompressed state and at least a portion of the biasing element is to extend outside of the cavity beyond an end defined by the housing;
    compressing the biasing element to a compressed state until the portion of the biasing element extending outside of the cavity is positioned inside the cavity;
    coupling a cover to the end of the housing to capture the biasing element in the cavity; and
    maintaining the biasing element in the compressed state during the coupling such that the biasing element does not engage the cover.

2. The method of claim 1, further comprising at least partially decompressing the biasing element after the cover is attached to the housing until the biasing element engages the cover.

3. The method of claim 1, further comprising coupling a plate to the portion of the biasing element extending from the cavity when the biasing element is in the uncompressed state.

4. The method of claim 3, further comprising coupling the plate to a stem via a fastener.

5. The method of claim 4, further comprising rotating the fastener in a first direction relative to a longitudinal axis of the stem to compress the biasing element via the plate, wherein rotating the fastener in the first direction causes the plate to move in a first rectilinear direction along the longitudinal axis to compress the biasing element.

6. The method of claim 5, further comprising rotating the fastener in a second direction opposite the first direction relative to the longitudinal axis of the stem to decompress the biasing element via the plate, wherein rotating the fastener in the second direction causes the plate to move in a second rectilinear direction along the longitudinal axis to decompress the biasing element.

7. The method of claim 4, further comprising compressing the biasing element until a flow control member operatively coupled to the stem engages a first stop of a valve.

8. The actuator of claim 7, further comprising decompressing the biasing element until the flow control member engages a second stop of the valve after the cover is attached to the housing.

9. The method of claim 4, further comprising removing the fastener from the stem via an aperture provided in the cover when the cover is coupled to the housing.

10. The method of claim 1, wherein maintaining the biasing element in a compressed state comprises compressing the biasing element in the cavity until the portion of the biasing element is positioned away from the end of the housing.

11. A method comprising:
    positioning a biasing element in a cavity of an actuator;
    compressing the biasing element to a compressed position during assembly of the actuator;
    maintaining the biasing element in the compressed position inside the cavity; and
    coupling a cover to the actuator when the biasing element is in the compressed position such that the biasing element does not engage the cover when the cover is being attached to the actuator; and
    decompressing the biasing element after the cover is attached to the actuator until the biasing element engages the cover.

12. The method of claim 11, further comprising compressing the biasing element to disengage the biasing element and the cover, and removing the cover from the actuator free from a force of the biasing element imparted to the cover when the biasing element is in engagement with the cover.

13. A method comprising:
positioning a spring having a relaxed state in a cavity of a housing having a first length such that the spring has a second length that is greater than the first length and at least a portion of the spring extends from the housing;
compressing the spring via a compression assembly to a first compressed state having a third length that is less than the first length; and
attaching a cover to the housing to enclose the cavity after the spring is positioned in the first compressed state via the compression assembly, at least a portion of the compression assembly being accessible via the cover when the cover is coupled to the housing.

14. The method of claim 13, further comprising compressing the spring to a second compressed state after the cover is attached to the housing.

15. The method of claim 14, further comprising accessing the compression assembly via an aperture formed in the cover, when the cover is coupled to the housing, to enable movement of the spring between the first compressed state and the second compressed state.

16. The method of claim 14, further comprising spacing the spring apart from the cover to disengage the spring and the cover when the cover is at least one of attached or removed relative to the housing such that the cover is free from a force imparted by the spring to prevent galling of the cover.

17. The method of claim 14, further comprising coupling the compressing assembly to a first end of the spring, the first end of the spring to be oriented toward the cover.

18. The method of claim 17, further comprising rotating a fastener of the compression assembly in a first direction about a longitudinal axis of the fastener to cause the spring to move toward at least one of the first compressed state or the second compressed state and rotating the fastener in a second direction about the longitudinal axis opposite the first direction to cause the spring to move toward the other one of the compressed states.

19. The method of claim 18, further comprising positioning a plate of the compression assembly between a head of the fastener and the first end of the spring such that the plate evenly distributes a load to the first end of the spring when the fastener rotates relative to the longitudinal axis.

* * * * *